United States Patent Office 3,532,543
Patented Oct. 6, 1970

3,532,543
BATTERY EMPLOYING LITHIUM - SULPHUR ELECTRODES WITH NON-AQUEOUS ELECTROLYTE
Dominick A. Nole, Sacramento, and Vladimir Moss, Rancho Cordova, Calif., assignors to Aerojet-General Corporation, El Monte, Calif., a corporation of Ohio
No Drawing. Filed Feb. 21, 1968, Ser. No. 707,330
Int. Cl. H01m 35/02, 39/04
U.S. Cl. 136—6                                   1 Claim

ABSTRACT OF THE DISCLOSURE

A battery utilizing a non-aqueous electrolyte employing a solvent such as ethylene carbonate, propylene carbonate, dimethoxyethane and γ-butyrolactone and mixtures thereof and a lithium salt solute and containing the reaction product of carbon disulfide and finely divided lithium powder, a lithium anode and a sulphur-containing cathode.

---

This invention relates to electric cells and, more particularly, provides a battery utilizing a non-aqueous electrolyte, and electrodes of lithium and sulphur.

Lithium batteries have been investigated heretofore, some of which are operable at ambient temperatures and others at elevated temperatures of several hundred degrees. Non-aqueous organic electrolytes for use at low temperatures have been proposed and various electrode couples with lithium as the anode have been suggested and investigated but all are characterized by shortcomings which have seriously limited their applications.

The battery of the present invention provides a distinct advancement in lithium electric cells and is characterized by a relatviely high efficiency. The improved cell exhibits in its preferred embodiments reduced internal resistance and has relatively little initial voltage drop upon commencement of discharge. The improved electric cell of the invention has a substantially flat discharge characteristic at a relatively high voltage level over relatively long periods of time.

The high energy density battery of the invention utilizes a lithium anode and a sulphur-containing cathode, together with an organic electrolyte such as ethylene carbonate, propylene carbonate, dimethoxyethane and γ-butyrolactone and a soluble lithium salt as the solute. Lithium perchlorate is the preferred solute, although other lithium salts may be employed such as lithium aluminum chloride, lithium fluoborate, lithium hexafluoroborate and lithium hexafluorophosphate.

Ethylene carbonate, propylene carbonate, dimethoxyethane and γ-butyrolactone are all chemically compatible with the lithium and sulphur electrodes and exhibit an acceptable specific resistance, making them suitable for use in the high energy density battery of the invention. Electrolyte conductivity is dependent on both the viscosiy and dielectric constant of the solvent. Low viscosity and high dielectric constant of a solvent favor high electrolyte conductivity of the electrolyte. It is noted that it is sometimes possible to prepare an electrolyte of improved specific resistance by combining a solvent having a high dielectric constant and an unfavorably high viscosity with one having a low or medium dielectric constant and a desirably low viscosity. A particularly desirable electrolyte employing the foregoing principle is prepared from a solution of dimethoxyethane and ethylene carbonate with the two components of the solution being present in approximately equal amounts by weight in a preferred embodiment. Mixtures of γ-butyrolacetone and dimethoxyethane also form a superior electrolyte, exhibiting a specific resistance lower than either of the component solvents. Dimethoxyethane has a relatively low viscosity and is desirably used in combination with one of the other solvents, such as ethylene carbonate, propylene carbonate, and γ-butyrolactone to form the preferred electrolyte used in the cell of the invention. Typically, the dimethoxyethane comprises by weight 30 to 70% of the solvent mixture.

Molar solutions of the electrolyte with one mole of the lithium salt being employed per liter of the organic solvent are generally used. Solutions containing from about 0.5 to 2 moles of the lithium salt per liter of solvent may be employed. It has been generally observed that there is an optimum concentration of the solute in the electrolyte for minimum specific resistance. For example, in the use of the solute lithium perchlorate, molar solutions of the suitable solvents are generally preferred to concentrations of say 0.5 mole or 1.5 moles per liter of the solvent. In one particular instance a molar solution of lithium perchlorate at 40° C. exhibited a specific resistance of about 73 ohms per square centimeter compared with a specific resistance of approximately 96 at 0.5 mole and a specific resistance of 108 for 2.0 moles. It will be appreciated that concentrations of the solute outside of the range of 0.5 to 2.0 moles may be utilized, especially at higher temperatures, but generally with an increase of specific resistance.

Various cathode configurations have been investigated and it has been found generally desirable to employ the sulphur in combination with a conductive carbon to improve the conductivity of the cathode. While powdered sulphur may be pressed with particulate carbon and a suitable binder into a cathode configuration, this practice has not been usually followed as the resulting structure is not porous enough to allow good electrolyte penetration. The preferred cathode configuration uses a porous carbon cloth structure upon which the active cathode material which may be either sulphur or a mixture of sulphur and a cathode composition such as cupric chloride have been applied. The active cathode ingredients are preferably applied to the carbon cloth support in mixture with conductive carbon and a suitable binder such as polyvinylchloride resin.

In one manner of application of the active ingredients to the carbon cloth support, a coating dispersion is prepared by placing 10 grams of a 70/30 mixture of powdered sulphur and powdered carbon black (previously ground and blended in a mortar) into 100 ml. of a 70/30 methylene chloride-carbon disulfide carrier containing 1.5% of polyvinylchloride resin. This mixture is then sprayed or dropped onto the carbon cloth support, and the solvent permitted to evaporate, leaving an electrode which is ready for use in the cell of the invention. The sulphur cathode and the lithium anode are at least partially immersed and usually wholly immersed in the electrolyte solution of the cell.

Various techniques are available for the formation of the lithium anode. A particular simple structure involves the pressing of thin lithium sheets (circa 0.02 inch thickness) on either copper or stainless steel support screens. The cell is best constructed with an excess of lithium.

It is usually preferred to provide porous separators between the anode and cathode of the electrolytic cell and to this end a number of inert porous separator materials have been investigated with respect to their ability to pass current and to withstand the effects of the non-aqueous elecrolytes. It will be understood that the separator is not an absolute necessity to the operation of the cell but a desirable element. Of the various porous separators tested, a polyethylene filter paper having about 60% porous area performed the best.

The battery of the invention has a theoretical energy density of 1130 watt-hr./lb. This energy density is approximately 30% greater than the best non-aqueous organic electrolyte system employing a lithium anode and copper fluoride $CuF_2$ previously suggested. During discharge of the cell of the invention, lithium metal of the anode is converted to lithium ion and in the process one electron is given up to the external circuit. Simultaneously, the sulphur of the cathode obtains two electrons from the external circuit to form the sulfide ion. Upon charging the lithium ion receives one electron from the charged circuit and plates out as lithium metal on the anode while the sulfide ion gives up two electrons and is reconverted to sulphur at the cathode. The lithium-sulphur battery is characterized by a high energy density with a theoretical output of 1.3 to 2.0 times that of lithium batteries previously suggested. It is rechargeable, but, however, may be utilized as a D-type cell.

In one configuration of the D-cell the cathode, anode and separator are cut into elongated strips, for example, strips of 1½ inches by 10 inches. The strips are laid with the anode on the bottom followed by the separator, then the cathode, and another separator. The strips are rolled around a carbon rod and inserted into a copper case of the D-cell type. Desirably, internal cathode contact is improved by forming a slot in the carbon rod into which the cathode is inserted and bonded with a conductive carbon, sulphur, a volatile solvent such as methylene chloride, and a polyvinylchloride binder. After an electrolyte is added to the D-cell, the cell is sealed with either epoxy resin or silicon rubber. In the preferred embodiment a metal screw is located in the top of the carbon rod and upon sealing of the battery, the carbon rod per se is enclosed within the cell, leaving only the metal screw exposed for electrical contact. This type of cell may be loaded to about a 10 ampere hour capacity.

In a second D-cell configuration, the lithium anode strip is inserted against the inside circumference of the copper case, a separator placed against the anode and a paste of cathode material cast into the remaining portion of the case. The paste comprises powdered conductive carbon, powdered sulphur, a volatile solvent and binder. The volatile solvent is permitted to evaporate leaving a porous cathode structure. Prior to the drying of the paste through evaporation of the solvent, a carbon rod is inserted to provide electrical contact. After the cathode paste has dried, an electrolyte is added and the cell sealed in the fashion described previously. Again, it is desirable to completely seal the carbon rod within the battery case, leaving only a metal screw or other conductive surface exposed for electrical contact. The open circuit voltage of the cell is 2.8 volts. The initial internal resistance is substantially the same as that experienced in the first D-cell configuration described above, but after a short period on closed circuit the cell resistance began increasing at a considerably faster rate. It is possible to load the cell of the second configuration as much as 20 ampere hours capacity.

It has been found that the efficiency of the electric cell of the invention may be considerably improved by the use of a soluble sulfide material in the electrolyte, the sulfide material serving to boost the cell capacity and to extend the duration of discharge at the higher voltage. This improved electrolyte which may be described as a "reacted" electrolyte may be prepared by adding carbon disulfide to the electrolyte solvent and in a preferred embodiment is prepared by incorporating both finely divided lithium powder and carbon disulfide in the electrolyte which is then permitted to react at room temperature under constant stirring for a prolonged period, for example, for a period of a week, to prepare the "reacted" electrolyte.

In one manner of preparing the "reacted" electrolyte, finely divided lithium powder in the amount of 12 grams per liter and carbon disulfide in the amount of 50 ml. per liter is incorporated in a 50/50 mixture of dimethoxyethane and ethylene carbonate, along with one mole of lithium perchlorate. The resultant mixture is permitted to stand at room temperature for a week with constant stirring. Upon completion of the reaction, the mixture is filtered and the resulting "reacted" solution is then available for use in the cell of the invention as the electrolyte. The use of the "reacted" electrolyte has been found to boost the discharge efficiency of a particular cell from 24 to over 50%. It is also noted that when one particular cell containing the "reacted" electrolyte is permitted to set over a weekend after being depleted to 41.2% of its capacity, its open circuit voltage returns to the normal 2.55 volts and an additional 0.17 ampere hour discharge is obtained, resulting in a total discharge efficiency of 73.4%. The cell of the invention may be discharged (and recharged) to essentially 100% of theoretical capacity; however, because of internal resistance, the last 20–25% of capacity is normally not considered profitable. Attempts have been made to identify precisely the active products in the "reacted" electrolyte but as yet this has not been conclusively established although it is evident that the materials are soluble sulfide. It is believed that the compositions are likely polysulfides containing both lithium and sulphur. Carbon disulfide may also be present. It is believed that the "reacted" electrolyte minimizes or substantially prevents the formation of polysulfides on the cathode during charge and discharge.

In an attempt to further improve the overall efficiency of the cell, copper halide salts have been added to the sulphur cathode matrix, it being felt that the copper ions would limit the formation of polysulfides and reduce internal cell resistance during charge and discharge. The copper halides are known electro-chemically active materials. In one test, copper chloride, $CuCl_2$, was added to the cathode matrix with one-half equivalent of copper chloride being supplied for every equivalent of sulphur. The electrolyte was a 50/50 mixture of dimethoxyethane and ethylene carbonate with one mole of lithium perchlorate. The initial voltage of the test cell was 3.55 volts which is somewhat higher than the usual 2.6 volts of a regular sulphur cell. However, unlike the regular sulphur cell, the voltage dropped continuously during discharge. Compared with a regular cell, the average operational voltage is approximately the same. It is noted that the addition of the copper chloride, $CuCl_2$, did improve cell resistance during both charge and discharge periods.

In an open cell there is a tendency for lithium carbonate to form on the anode and to minimize this tendency the battery of the invention is preferably sealed in a case to exclude gases including carbon dioxide and moisture.

While several embodiments of the invention have been illustrated and described, it will be understood that the invention should not be construed as being limited thereto, but only to the lawful scope of the appended claim.

We claim:
1. In an organic electrolyte, high energy density battery, employing a lithium anode, the improvement in combination therewith comprising:
   an organic electrolyte solution having a solvent selected from the group consisting of ethylene carbonate, propylene carbonate, dimethoxyethane and gamma butyrolacetone and mixtures thereof and a solute comprising a soluble lithium salt, said electrolyte being initially prepared by dispersing carbon disulfide and finely divided lithium powder in the solvent of the electrolyte and permitting the resultant mixture to undergo reaction; and a sulphur-containing cathode, said sulphur cathode and lithium anode being at least partially immersed in the electrolyte solution.

References Cited

UNITED STATES PATENTS

| | | | |
|---|---|---|---|
| 2,807,658 | 9/1957 | Hatfield | 136—121 |
| 2,871,281 | 1/1959 | Moulton | 136—25 |
| 3,073,884 | 1/1963 | Pinkerton | 136—100 |
| 3,121,028 | 2/1964 | Story | 136—6 |
| 3,185,590 | 5/1965 | Mayer et al. | 136—6 |
| 3,248,265 | 4/1966 | Herbert | 136—6 |
| 3,393,093 | 7/1968 | Shaw et al. | 136—6 |
| 3,413,154 | 11/1968 | Rao | 136—100 |
| 3,423,242 | 1/1969 | Meyers et al. | 136—100 |

WINSTON A. DOUGLAS, Primary Examiner

C. F. LEFEVOUR, Assistant Examiner

U.S. Cl. X.R.

136—100, 154